United States Patent [19]

Taillet et al.

[11] Patent Number: 5,071,532

[45] Date of Patent: Dec. 10, 1991

[54] DEVICE FOR ELECTRICAL TREATMENT OF HIGH CONDUCTIVITY LIQUID ELECTROLYTES

[75] Inventors: Joseph Taillet, 33, rue de la Tourelle, F 92100 Boulogne; Dominique Bacot; Jean-Michel Detroyat, both of Paris, all of France

[73] Assignee: Joseph Taillet, Boulogne, France

[21] Appl. No.: 456,457

[22] Filed: Dec. 26, 1989

[30] Foreign Application Priority Data

Dec. 26, 1988 [FR] France .................................. 88 17192

[51] Int. Cl.<sup>5</sup> .................. C25B 9/00; C25B 11/02; C25B 15/08; C25B 13/02

[52] U.S. Cl. ............................ 204/228; 204/231; 204/272; 204/275; 204/290 R; 204/302; 204/305

[58] Field of Search ............ 204/275, 290 R, 302–308, 204/280, 272, 231, 228

[56] References Cited

U.S. PATENT DOCUMENTS

| | | | |
|---|---|---|---|
| 2,490,730 | 12/1949 | Dubilier | 204/305 |
| 3,528,905 | 9/1970 | Miller | 204/275 X |
| 3,540,994 | 11/1970 | Napier | 204/302 |
| 3,728,245 | 4/1973 | Preis et al. | |
| 3,798,150 | 3/1974 | Gilchrist | |
| 3,859,195 | 1/1975 | Williams | |
| 4,073,712 | 2/1978 | Means et al. | |
| 4,097,357 | 6/1978 | Jacquelin | 204/272 X |
| 4,235,698 | 11/1980 | Arnaud | |
| 4,293,400 | 10/1981 | Liggett | 204/272 X |
| 4,415,426 | 11/1983 | Hsu et al. | 204/302 X |
| 4,722,787 | 2/1988 | Fombarlet et al. | 204/302 X |
| 4,886,593 | 12/1989 | Gibbs | 204/290 R X |

FOREIGN PATENT DOCUMENTS

| | | |
|---|---|---|
| 497936 | 5/1972 | Australia . |
| 0001285 | 4/1979 | European Pat. Off. . |
| 2708240 | 8/1978 | Fed. Rep. of Germany . |
| 852333 | 1/1940 | France . |
| 2547573 | 12/1984 | France . |
| 279916 | 4/1952 | Switzerland . |
| 387558 | 5/1965 | Switzerland . |
| 1274902 | 5/1972 | United Kingdom . |

*Primary Examiner*—Donald R. Valentine
*Attorney, Agent, or Firm*—Dennison, Meserole, Pollack & Scheiner

[57] ABSTRACT

Device for the electrical treatment of high conductivity liquid electrolytes, comprising: a receptacle (10) suitable for being traversed by a flow (F) of the liquid to be treated; at least one electrode (20) disposed inside the receptacle (10) and having a conductive surface of a shape chosen to increase the surface area of contact with the electrolyte, and coated with an insulating layer (22); at least one counter-electrode (24) disposed inside the receptacle (10) and having a conductive external surface, bare or coated with an insulating layer; and a high voltage DC supply (26) whose positive (28) and negative (30) terminals are connected respectively to the or each electrode and the or each counter-electrode respectively, the polarity used depending on the type of treatment to be carried out.

The device can be used in particular for treating mains water or river water in order to prevent furring in cooling equipment.

19 Claims, 4 Drawing Sheets

DEVICE FOR ELECTRICAL TREATMENT OF HIGH CONDUCTIVITY LIQUID ELECTROLYTES

The invention relates to a device designed for the electrical treatment of high conductivity liquid electrolytes.

BACKGROUND ART

The concept of high conductivity can be presented in two ways, and it can be shown that the properties thus highlighted are correlative:

In theory, it is shown that if an electrical field E is suddenly applied perpendicular to the free surface S of a conductive medium of permittivity $\epsilon$ and resistivity $\rho$, currents develop in this medium which bring, close to the surface S, electrical charges which resist the penetration of the external field within the medium, except into a surface layer whose thickness is very much less than a thousandth of a millimeter. This phenomenon however requires a certain amount of time and, during this time, the external field can penetrate the medium. This time is calculated by the formula $\tau = \epsilon\rho$. The liquid is of high conductivity if the time $\tau$ is very much less than the characteristic times of the electrical effects external to the medium, for example the period of the applied alternating electrical field.

In practice, a given volume (for example a 1 meter cube) of high conductivity liquid is traversed by high currents (for example hundreds or thousands of amperes) if a low voltage (of the order of a few volts) is applied between the faces of the cube; on the other hand, for a low conductivity liquid these figures can be respectively several nanoamperes for voltages of tens of kilovolts.

It follows that, in a high conductivity liquid, it is not possible to apply potential differences between two points in the liquid (or, which amounts to the same thing, to apply an electrical field of a measurable value to the liquid) without causing very high currents to pass through it, which is completely out of the question if, in the liquid, there are no conducting electrodes in direct contact with this liquid.

The invention relates in particular to the electrical treatment of mains or river water, used for example as cooling water, in order to avoid fur being deposited in the cooling equipment through which this water runs. It relates in particular to heat exchanger tubes and the cooling tubes in steam condensers, used in thermal or nuclear power stations. Another example relates to scrubbing water used to take away the excess aerosol paint produced during the painting of motor vehicle bodies using spray guns; this aerosol paint, in untreated water, forms a film which adheres to the walls, which poses difficult cleaning problems; if the water has been treated (for example electrically) the aerosol paint flocculates in the form of minute non-adherent elementary specks which are washed away by the stream of scrubbing water and which can easily be disposed of.

There already exist many processes for treating liquids using the effects of electrical or magnetic fields. These processes, which aim to give these liquids properties helpful in the use of certain techniques, are all characterised by the fact that these fields penetrate the liquids on which they have to act.

First of all, various patents can be cited relating to the treatment of hydrocarbons serving as fuels for internal combustion engines, that is to say liquids which, unlike water, behave essentially as dielectrics.

For example, the U.S. Pat. No. 3,116,726 in the name of M J KWARTZ describes a device designed to improve combustion in internal combustion engines, this device being formed by a coil designed to subject the fuel to a strong magnetic field. The U.S. Pat. No. 4,373,494 in the name of MACMAHON also concerns the treatment of hydrocarbon fuels and describes a device making it possible to apply a strong electrical field to the fuel before its combustion. As the fuel is an insulating dielectric, the electrical field can penetrate it without difficulty. The MACMAHON patent is concerned with increasing the strength of the field within the fuel. The British patent 806 230, in the name of MELI, relates to a device designed to subject the fuel to electromagnetic fields. This does specify that it relates to a fuel and that the means intended to apply the fields are connected intermittently to the current source, which excludes any action involving the continuous application of a current or voltage. This feature is in fact essential since experts know that electromagnetic effects can be produced only by variable voltages or currents.

In addition, other patents are known relating to the application of electrical or magnetic fields to a liquid.

For example, the French patent No 70.31089, published under the number 2 059 215, in the name of the LABOR MUSZERIPARI MUVEK Company, relates to a process for treating liquids, in general, in which such liquids are made to move in a configuration of electrical fields formed by alternating fields, or are treated at rest by voltage pulses, the orientations of which form angles governed by a specific relationship involving the permittivities of the walls of the receptacle and of the liquid, it being possible to apply an additional magnetic or electrical field along the flow of the liquids. This patent is thus based on the existence of variations in the direction of application of the effect of the fields under consideration on the same fluid molecule, where such variations may result either from the change in orientation of the effect over time if the molecule is at rest, or from the change caused, because of the flow, by the passage of the molecule in fields of different directions.

The U.S. Pat. No. 4,073,712, in the name of MEANS et al, claims electrostatic treatment of water based on the penetration of the electrical field into the water. The patent describes a device of electrodes of which at least one is insulated and between which the fluid to be treated must pass. The patent specifies clearly that the percentage of the potential appearing within the liquid must exceed 50% of the total potential applied to the electrodes. These potentials are calculated using conventional capacitance formulae involving the permittivity of the liquid, the equivalent diagram of the assembly being formed by capacitors in series, which shows that the process involves the electrical fields entering fully into the liquid to be treated.

This process can therefore be applied only to liquids with extremely high resistance, for example oil, but certainly not to water, contrary to what is indicated in the patent.

On the other hand the invention applies, as already indicated above, to the treatment of liquids whose conductivity is sufficiently high to prevent the continuous electrical field from penetrating, in the absence of any passage of current, beyond a surface layer of a depth less than one thousandth of a millimeter. In the case of mains or river water, the permittivity has a constant value (M.K.S. units):

$$\epsilon = 8.854 \times 10^{-12} \times 80 = 7 \times 10^{-10} Fm-1$$

The resistivity depends on the purity of the water; it varies from 1 $\Omega m$ for water with a very high content of dissolved salts to 500 $\Omega m$ for very pure water. If the latter case (low conductivity water) is chosen by way of example:

$$\rho = 500 \ \Omega m \text{ therefore } \epsilon\rho = 3.5 \times 10^{-7} S$$

The time during which the external field can penetrate within the liquid, consequent upon a sudden application by means for example of an electrode coated with insulation, is less than one millionth of a second. Thus not only a continuous electrical field but also alternating fields of industrial frequency up to megahertz levels are incapable of penetrating the water (on the other hand, as is well known, electrical fields at a frequency of 2.45 gigahertz in microwave ovens penetrate it easily).

SUMMARY OF THE INVENTION

The subject of the invention is a new device for electrical treatment of high conductivity liquid electrolytes, in particular mains or river water.

In accordance with the invention, the electrical treatment device comprises, a receptacle suitable for being traversed by a flow of the liquid electrolyte to be treated; at least one electrode disposed inside the receptacle and having a conductive surface of a shape chosen to increase the surface area of contact with the electrolyte, and coated with an insulating layer, the total surface area of this or these electrode(s) being 10 to 1000 times greater than that of the conductive surface electrodes currently used to carry out DC electrolysis of the same quantity of electrolyte; at least one counter-electrode disposed inside the receptacle and having a conductive surface, bare or coated with an insulating layer; the total surface area of the counter-electrode(s) coated with an insulating layer being of the same order of magnitude as that of the electrode(s), whilst the total surface area of the bare counter-electrode(s) may be smaller; and a high voltage DC supply whose positive and negative terminals are connected respectively to the or to each electrode and to the or to each counter-electrode, the polarity used depending on the type of treatment to be carried out.

When a high voltage is supplied to the or to each electrode or counter-electrode coated with an insulating layer, a barrier phenomenon occurs at the point of contact between this insulating layer and the electrolyte to be treated, which is at the same potential as the metal parts, generally earthed, of the equipment containing it or, where this equipment is completely non-conducting, at the potential of the said bare electrodes.

This phenomenon is a concentration of ions in the immediate vicinity of the barrier, a concentration which has the effect of accelerating the chemical reactions required for the treatment sought for the electrolyte. For example, in the case of the treatment of water to prevent the furring of pipes, the chemical reactions favoured are those which lead to the production of nuclei of limestone or calcium carbonate in suspension in the liquid in order to achieve in consequence a deposit of fur, not on the surfaces of the equipment, but on these nuclei. It is then easy to get rid of this fur in suspension, whilst the elimination of fur deposited on a surface is very difficult.

The phenomenon which has just been described, and which depends on the properties of the layer of contact between the electrolyte and an electrode coated with an insulating layer, is similar to the so-called heterogeneous catalysis phenomenon used in chemical engineering, in which the reactions taking place at the interfaces play a preponderant role.

As this is a barrier phenomenon which occurs at the point of contact of the insulating layer and the or each electrode energised at high voltage, the mutual disposition of the electrodes and counter-electrodes is not critical.

Because of this, the or each electrode on the one hand and the or each counter-electrode on the other hand can be situated at the same level in the flow of electrolyte in the receptacle, whilst the latter can have a coaxial or non-coaxial structure, symmetrical or non-symmetrical.

As a variant, the or each electrode on the one hand and the or each counter-electrode on the other hand can be situated downstream or upstream of each other in the flow of electrolyte in the receptacle, whilst here too the latter can have a coaxial or non-coaxial structure, symmetrical or non-symmetrical.

On the other hand, it is highly advantageous to select electrodes which have a wall surface area as large as possible so that the surface area of contact between the insulating layer and the electrolyte to be treated is the greatest possible.

In one embodiment of the invention, the device comprises several electrodes consisting of plates disposed parallel to the flow of electrolyte in the receptacle.

In another embodiment of the invention, the or each electrode is in the form of a section with a star-shaped cross section.

In another embodiment of the invention, the or each electrode is in the form of a circular cylinder to which are attached circular rings of a diameter greater than that of the cylinder.

In another variant, the device comprises several electrodes made in the form of a multiplicity of insulated wires. These insulated wires can be stretched parallel to the direction of flow of the electrolyte inside the receptacle or else they can form an angle greater than zero to this direction of flow.

In a preferred embodiment of the invention, the or each counter-electrode has a bare metal surface which is connected to earth through a resistor so as to protect the device against short-circuit currents.

In another embodiment of the invention, the or each counter-electrode has a metal surface coated with an insulator, a resistance bridge with an intermediate point connected to earth then being disposed between the or each electrode on the one hand and the or each counter-electrode on the other hand.

In the case where only the electrode or each of the electrodes is provided with an insulating layer, the latter is advantageously made from a polymer which is subjected to an electrical field insufficient to cause breakdown but sufficiently strong to result in the migration of electrical charges across the insulating layer of coating.

In the case where the or each electrode and counter-electrode is coated with an insulating layer, the latter is also advantageously made from a polymer which must be subjected to an electrical field insufficient to cause breakdown but sufficiently strong to result in the migration of electrical charges across the insulating layer of coating.

In another variant embodiment, the invention provides that the device comprises in addition at least a third electrode having a bare conductive surface, energised at an electrical voltage intermediate between that of the or each electrode and that of the or each counter-electrode.

BRIEF DESCRIPTION OF THE DRAWINGS

In the following description, given solely by way of example, reference is made to the annexed drawings, in which.

DESCRIPTION OF THE PREFERRED EMBODIMENTS

Figures 1, 2:
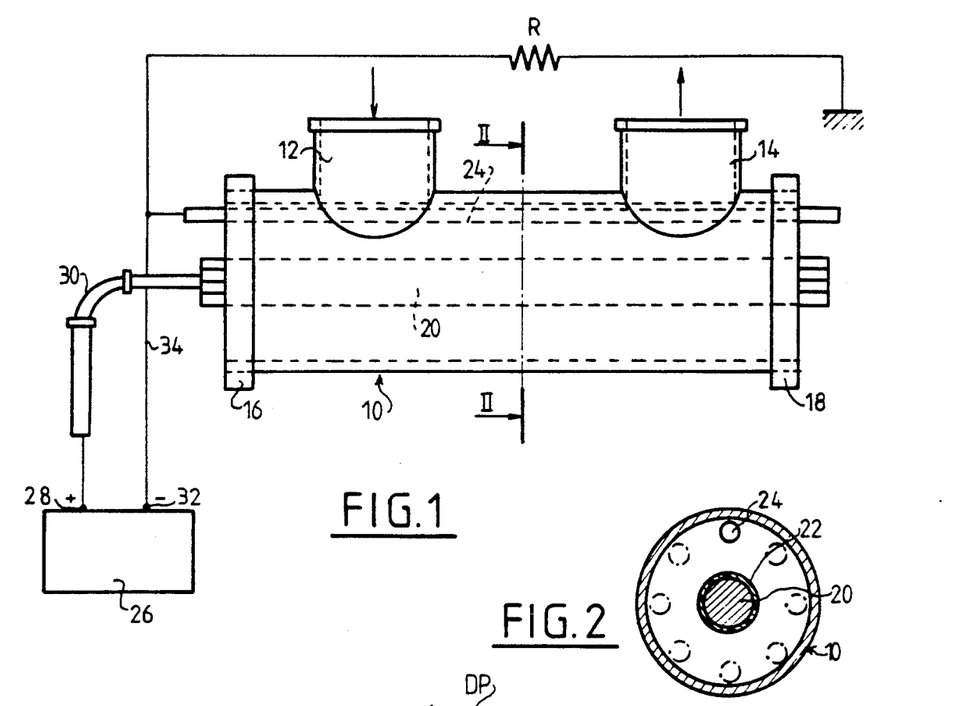
FIG. 1 is a diagrammatic elevation view of a device in accordance with the invention.
FIG. 2 is a cross-section through line II—II in FIG. 1.

The electrical treatment device, as shown in FIGS. 1 and 2, comprises a receptacle 10 of an overall circular cylindrical shape open at its two ends, this receptacle being able to be made from a conductive or insulating material. The receptacle 10 has two side connections: an inlet connection 12 and an outlet connection 14 for the liquid electrolyte to be treated. Two flanges 16 and 18 are fixed to the two open ends of the receptacle 10, in such a way as to be removable and watertight. Between these two flanges is mounted, at their centres, an electrode 20 in the form of a solid cylindrical bar made from a conductive material, this electrode being coated with an insulating layer 22, made for example from a polymer. In addition, a counter-electrode 24, consisting of a cylindrical bar running parallel to the electrode 20, is mounted between the two flanges 16 and 18. The external surface of the counter-electrode 24 is bare, that is to say uncoated.

The device comprises in addition a high voltage DC supply 26 of the order for example of a few tens of kilovolts, whose positive terminal 28 (high voltage terminal) is connected to the electrode 20 by an electrical connection 30 and whose negative terminal 32 (low voltage terminal) is connected to the counter-electrode 24 by an electrical connection 34. This connection 34 is connected to earth through a resistor R, of 100 ohms for example. Although the device shown in FIGS. 1 and 2 comprises only a single counter-electrode 24, it is possible, as shown in broken lines in FIG. 2, to use eight counter-electrodes 24, running parallel to each other and distributed evenly around the central electrode 20.

The operation of the device shown in FIGS. 1 and 2 depends on the use of three physico-chemical mechanisms:

1) The law of chemical balance, known as the "law of mass action";
2) The existence, at the interface between a liquid electrolyte and a solid or gaseous body, of an electrified layer known as a "double layer";
3) The existence within a solid insulator, and more particularly a polymer, of point defects in the crystal lattice which may fulfil the role of charge carriers.

The first of these mechanisms is well known. As for the second and third, these relate to different specialities and have never been the subject of a publication capable of putting forward the possibility of a bringing together of the corresponding techniques. The device of the invention combines these three mechanisms, which makes it possible to achieve an optimal functioning of the device.

This can be shown in a particular case of great industrial importance, namely the treatment of cooling waters to prevent the deposit of fur in pipes and condensers.

a) Use of the Law of Mass Action in a Surface Layer to Displace a Chemical Equilibrium It has been shown by many authors that the introduction of crystalline nuclei of limestone $CO_3Ca$ within a flow of cooling water makes it possible to prevent the deposit of fur on the surfaces of the equipment; in fact, any subsequent crystallisation will tend to occur on these nuclei. In addition, the production of these nuclei results from the following reactions, the first of which is reversible:

$$Co_3H- + OH- \rightleftharpoons CO_3-- + H_2O \qquad (1)$$

$$CO_3-- + Ca++ \rightarrow CO_3Ca \qquad (2)$$

The first reaction is an equilibrium reaction. This balance is moved to the right (formation of carbonate ions $CO_3--$) if the product of the concentrations of the bicarbonate ion $CO_3H-$ and the hydroxyl ion $OH-$ increases. The result of this is that the second reaction is accelerated and the calcium carbonate crystallises, generally in the form of nuclei at the start of the reaction, and subsequently by increasing the volume of the crystals already deposited on the surfaces or in suspension in the liquid. It is therefore essential to produce nuclei in suspension quickly by accelerating the reactions as soon as untreated water is introduced into the system A conventional method of displacing the balance towards the right is to carry out electrolysis of the water, which slightly increases the quantity of hydroxyl $OH-$ ions. The invention proposes a different solution, which consists in increasing simultaneously and very strongly the concentration of the bicarbonate $CO_3H-$ and hydroxyl $OH-$ ions, not in all the liquid electrolyte but only in the layer in contact with an insulating surface, for example a polymer, that is to say the layer of coating on the or each high voltage electrode.

This increase in the concentration moves reaction (1) to the right: $CO_3--$ ions are produced. In addition, the arrangement proposed by the invention distances the positive Ca++ ions from the insulating surface and prevents, by that very fact, reaction (2) and thus the crystallisation from taking place on this surface. Thus the surface is to fulfil a catalytic role for the balance reactions (1), similar to that of the surfaces used in heterogeneous catalysis. This process is not exclusive of conventional electrolysis, with which it may be combined in order to improve the yield still further.

In order to achieve this increase in concentration, the invention uses the properties of the double electrical layer of the electrolytes and those of the migration of charges in the insulating polymers.

b) Utilisation of the Properties of the Double Layer of the Electrolytes

The physical properties of water derive from the fact that it is an electrolyte and from the polar structure of its molecule, which is formed by the combination of a negative oxygen O−− ion and two positive hydrogen H+ ions. The electrolytes are partially broken down into positive H+ ions and negative hydroxyl OH− ions. It has been known since HELMOLTZ (1853) that polar liquids and electrolytes are bordered, upon contact with a gas, another liquid or a solid, by a very thin boundary (a few hundredths of angstroms in thickness) known as the double electrical layer. This layer has been the subject of basic research since GOUY (1908), but no industrial application has, to the applicant's knowledge, been derived from these studies. All the work carried out within the framework of this basic research results in the following concepts:

The case of pure water (distilled water):

the polar molecules of the water line up perpendicular to the free surface or the area of contact with another liquid or gas; a layer of hydroxyl OH− ions is fixed on this surface and forms a layer of negative charge; the ions of this layer are connected by forces which prevent them from taking part in chemical reactions identical to those in the mass of the liquid;

at a distance of about 10 angstroms from the surface, ions of opposite signs (positive H+ ions) are concentrated, developing freely on a diffuse layer whose thickness (which may be as much as 100 angstroms) depends on the thermal agitation. The ions in this layer are capable of reacting chemically as in the mass of the liquid. The electrical space charge of this layer is equal to and of the opposite sign to that of the surface layer; it serves as a screen for the external electrical field, which is thus prevented from penetrating to within the liquid;

the distance between the two layers is so small that even very small potential difference (100 millivolts) between the two layers results in an extremely strong local electrical field (1 million volts per cm). The distance between the two layers behaves therefore as a capacitance capable of sustaining extremely strong fields without losing its insulating properties. This capacitance can be termed "molecular capacitance of the double layer". A typical value of this capacitance is 10 $\mu F\ cm^{-2}$, and a typical value for the surface charge of the double layer is 30 $\mu C\ cm^{-2}$.

The case of river or mains water containing, for example, calcium carbonate:

the surface layer here contains not only OH− ions but also calcium Ca++ ions, which are positive and, in consequence, reduce the overall electrical charge of the surface layer. Consequently the diffuse layer also has a lower charge; there is even a concentration of calcium ions which cancels out the mean charge of the surface layer, and therefore the potential of the double layer. Beyond this concentration, the ions in the surface layer are substantially positive, and the ions in the diffuse layer are negative. They are essentially represented by bicarbonate $CO_3H-$ and hydroxyl OH− ions.

When a conductive electrode is in contact with an electrolyte and a potential difference is applied between the electrode and the electrolyte, it is shown that, according to the nature of the electrode, electrical charges can be exchanged between these electrodes and the electrolyte, either from the lowest voltages (the so-called reversible electrode) or from a potential difference of the order of one volt (ideally polarisable electrodes). A current then circulates and electrolysis takes place. In fact, the chemical reactions are dominated by the presence of charge carriers originating from the electrodes. When the electrode is coated with a perfectly insulating layer, for example a layer of polymer, only the effect of attraction of the surface layer on the ions of opposite signs remains, which effect leads to the concentration of these ions in the diffuse layer, a concentration which leads to a shift in the chemical balance (1) and to the formation of $CO_3--$ ions. Finally, the Ca++ ions, which are of the same sign as those of the surface layer, are repelled outside the diffuse layer, so that reaction (2) can take place only in the mass of the liquid after the diffusion from the diffuse layer of the $CO_3--$ ions produced by reaction (1).

However, it was indicated above that, for untreated water, the surface layer has a rather smaller electrical charge, and therefore insufficient to produce the effect sought. In accordance with the invention, the electrical field of the double layer is increased artificially in order to increase the concentration of the reactive ions in the diffuse layer. For this purpose, the or each electrode is energised at a high positive potential. In order to have an idea of the effectiveness of this process, a convenient criterion consists in comparing the density of surface charges in the metal-polymer interface (at the point of contact between the electrode and the insulating layer) with the typical value of 30 $\mu C\ cm^{-2}$, which would be that of the interface layer between polymer and electrolyte if the latter were pure water. The laws of electrostatics show in fact that these charge layers have an identical attraction effect on the ions of the diffuse layer c) Migration of the Ions Across the Polymer Recent results from solid-state physics, applied to the case of insulating polymers, have shown that, under the effect of mechanical stresses relating to the application of a strong electrical field, crystal lattice defects appear in the polymers. These defects are favoured sites for the electrical charges. The application of the field is also accompanied by a charge injection at the metal-polymer interface. Because of the presence of the sites formed by the defects, the charges can migrate across the polymer. This physical situation is equivalent to an increase with the applied voltage of the value of the conductivity of the polymer, given that the current varies more quickly with the voltage than if Ohm's law were complied with.

The effect of the stray current is favourable to an increase in the electrical field of the double layer and, in consequence, the catalytic effect described above. If, for example, a strong positive voltage were applied to the or each electrode, the polymer-water interface will have its charge density increased, which will have the immediate effect of increasing the electrical field in the capacitance of the double layer and, in consequence, increasing the concentration of the negative ions in the diffuse layer. As these ions are capable of reacting chemically, the shift in chemical balance sought is thus encouraged. This mechanism is equivalent to placing a high value leakage resistance in parallel with the capacitance of the electrode insulating layer. This configuration can be compared with the equivalent diagram of untreated water, represented by a resistance of very low value in parallel with a capacitance. As for the double layer, this is equivalent to a pure capacity of the order of 10 $\mu F\ cm^{-2}$ so long as the potential difference which it sustains does not exceed a value of the order of one volt. It is thereafter equivalent to the same capacitance in parallel with a diode polarised by a battery cell with an electromotive force of the order of one volt, which lets pass all the current injected across the leakage resistance of the polymer.

Figure 3:
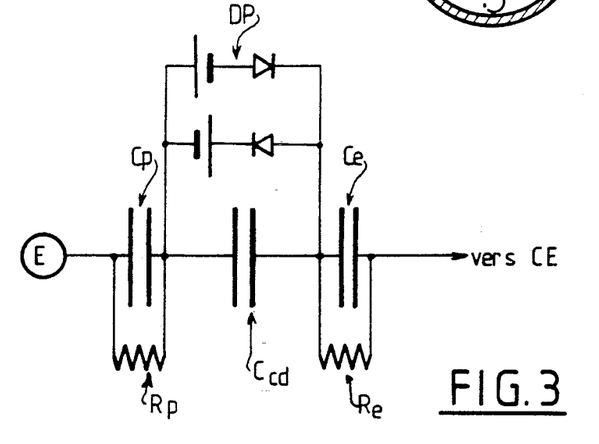
FIG. 3 shows the equivalent electrical diagram of the device of FIGS. 1 and 2.

The equivalent electrical diagram of the device of FIGS. 1 and 2 is shown in FIG. 3. This diagram corresponds to an interval formed by the sequence of a metal electrode E, an insulating coating (which can be a polymer), the double layer and the mass of the water (electrolyte).

The diagram comprises successively the electrode E to which is applied a high voltage DC electrical potential, the opposite electrode being termed the counter-electrode CE. Starting from the electrode E, three capacitors in series are found: a capacitor $C_p$ corresponding to the capacitance of the polymer, a capacitor $C_{cd}$ corresponding to the capacitance of the double layer, and a capacitor $C_e$ corresponding to the capacitance of the electrolyte. In parallel with the capacitor $C_p$, a resistor $R_p$ is found which corresponds to the leakage resistance of the polymer. In parallel with the capacitor $C_{cd}$, a polarised diode DP is found corresponding to the leakage resistance of the double layer and, in parallel with the capacitor $C_e$, a resistor $R_e$ corresponding to the leakage resistance of the electrolyte. The leakage resistance of the double layer is connected in parallel with the capacitor $C_{cd}$ representing the double layer if the potential applied to this capacitor exceeds a limit value of the order of one volt, whence the polarised diode shown in FIG. 3. The interface is then no longer "ideally polarisable", and a low conduction current can then traverse the double layer.

This low conduction current contributes towards bringing about electrolysis, the effects of which are added to the principal phenomenon of concentration of the ions in the diffuse layer which dominates the process; but this phenomenon is quite secondary vis-a-vis this principal phenomenon; in particular, the conduction current which causes it is considerably weaker (typically millions of times) than that which would be flowing in a conventional electrolysis device using the same surface area of electrodes. The significance of this current is essentially related to the fact that its presence guarantees that the potential difference obtained at the terminals of the molecular capacitors of the double layer has achieved its maximum value, which means that the concentration of ions in the diffuse layer has also indeed reached its maximum value.

The resistor R (FIG. 1) which is inserted between the return connection 34 of the high voltage supply (to which the counter-electrodes are connected) and earth has a protection role against arcing. In fact, if by accident the insulating layer 22 were pierced, the short-circuit current would form an arc which would then irreversibly damage not only the pierced electrode but also the counter-electrodes and would cause erosion of the counter-electrodes. It is important therefore that the counter-electrodes should be interchangeable and that the water circulation pipes should never fulfil the role of counter-electrodes.

Figure 4:
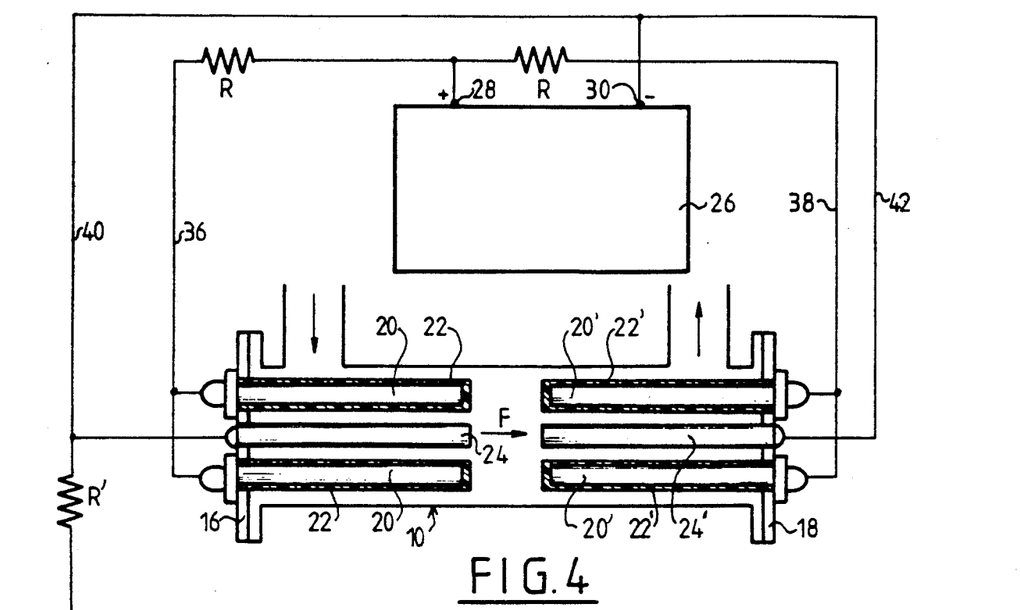
FIG. 4 is a diagrammatic elevation view of a device in accordance with another embodiment.

Reference is now made to FIG. 4 which shows another embodiment of the device which comprises a receptacle 10 similar to that of FIG. 1. The flange 16 supports, at its centre, a counter-electrode 24 with a bare external surface and, around the counter-electrode 24, at least two electrodes 20 whose external surface is coated with an insulating layer 22. In a similar manner, the flange 18 supports, at its centre, a counter-electrode 24' and, on either side of this counter-electrode, two or more electrodes 20' whose external surface is coated with an insulating layer 22'. All these electrodes are generally parallel to each other and parallel to the direction of flow of the liquid electrolyte within the receptacle, as shown by the arrow F. Consequently the electrodes 20 are located at the same level as the counter-electrode 24, in the flow of the liquid electrolyte inside the receptacle, and the same applies to the counter-electrode 24' which is located at the same level as the electrodes 22' in this flow.

The electrodes 20 are connected to the positive terminal 28 of the high voltage supply 26 by a connection 36 in which a resistor R is inserted, designed to limit the short circuit current. Similarly, the electrodes 20' are connected to the positive terminal 28 by a connection 38 in which another resistor R is inserted to limit the short-circuit current.

The counter-electrodes 24 and 24' are connected to the negative terminal 30 of the supply 26 by two connections 40 and 42 respectively, which are connected to earth through a resistor R' designed to protect the earthed pipework against short-circuit current.

As in the case of FIG. 1, the receptacle 10 can be made from a conductive or insulating material.

Figure 5:
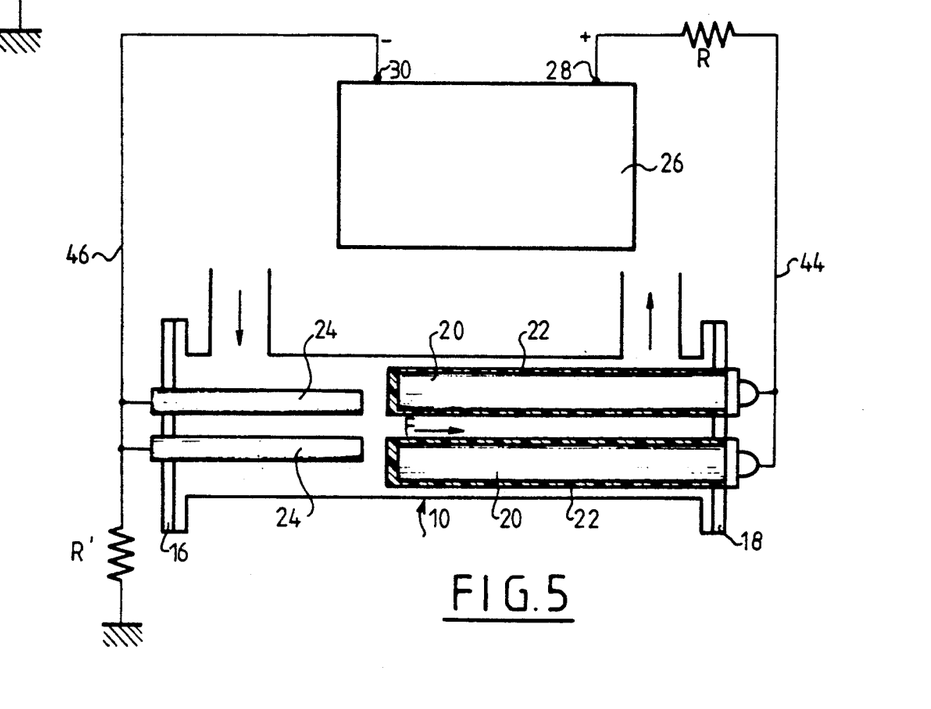
FIG. 5 shows a device in accordance with yet another embodiment.

In the embodiment of FIG. 5, to which reference should now be made, the device comprises a receptacle 10 similar to the receptacles shown in FIGS. 1 and 4.

The flange 16 supports at least two counter-electrodes 24 which are parallel to one another and which are immersed in the liquid electrolyte which runs through the receptacle 10.

The flange 18 supports at least two electrodes 20 whose external surface is coated with an insulating layer 22.

The electrodes 20 are connected to the positive terminal 28 of the high voltage supply 26 through a connection 44 in which is inserted a resistor R designed to limit the short-circuit current.

The counter-electrodes 24 are connected to the negative terminal 30 of the supply 26 by a connection 46 which is connected to earth through a resistor R' designed to protect the pipework against short-circuit current.

The electrodes 20 and the counter-electrodes 24 are generally parallel to one another and parallel to the direction of flow of the liquid electrolyte within the receptacle, as shown by the arrow F. In the example shown, the counter-electrodes 24 are situated upstream of the electrodes 20 with respect to the flow of the electrolyte as shown by the arrow F. As a variant, it could be provided that the electrodes 20 be situated upstream of the counter-electrodes 24.

In the devices shown in FIGS. 1, 4 and 5 respectively, the structure defined by the assembly of electrodes and counter-electrodes is coaxial and symmetrical. This symmetry is imposed not by the operating principle of the device but by considerations of convenience of fabrication.

Figure 6:
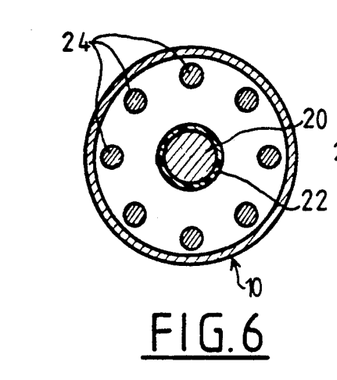
FIGS. 6, 7 and 8 show respectively, in cross section, a device with different configurations of electrodes and counter-electrodes.

In the embodiment of FIG. 6, to which reference should now be made, the receptacle 10 comprises, as shown in FIG. 2, a central electrode 20, coated on its external surface with an insulating layer 22, together with eight counter-electrodes 24 with a conductive surface in contact with the liquid and disposed around the periphery of the electrode 20.

Figure 7:
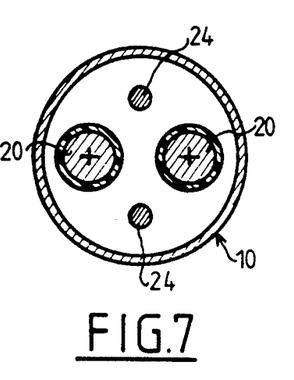

In the embodiment of FIG. 7, to which reference should now be made, the structure of the assembly is non-coaxial and non-symmetrical. Within the receptacle, two electrodes 20 are found disposed parallel to each other and at the same horizontal level, together with two counter-electrodes 20 with a conductive surface in contact with the liquid and running parallel to each other and placed in the same vertical line. In this embodiment, the electrodes and counter-electrodes are all made from circular cylindrical bars. However, the diameter of the counter-electrodes is much less than that of the electrodes.

Figure 8:
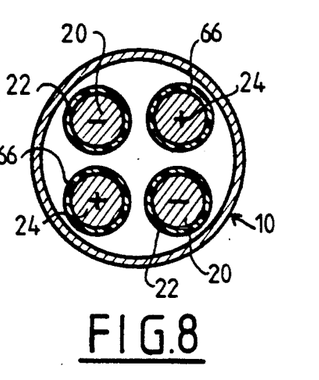

In the embodiment of FIG. 8, two electrodes 20 are also found disposed parallel to each other and in a plane inclined at an angle to the horizontal and vertical as well as two counter-electrodes 24 parallel to each other and disposed in a plane inclined at an angle to the horizontal and vertical. The electrodes and counter-electrodes are made from cylindrical bars of the same diameter and each coated with an insulating layer, 22 and 66 respectively.

Figure 9:
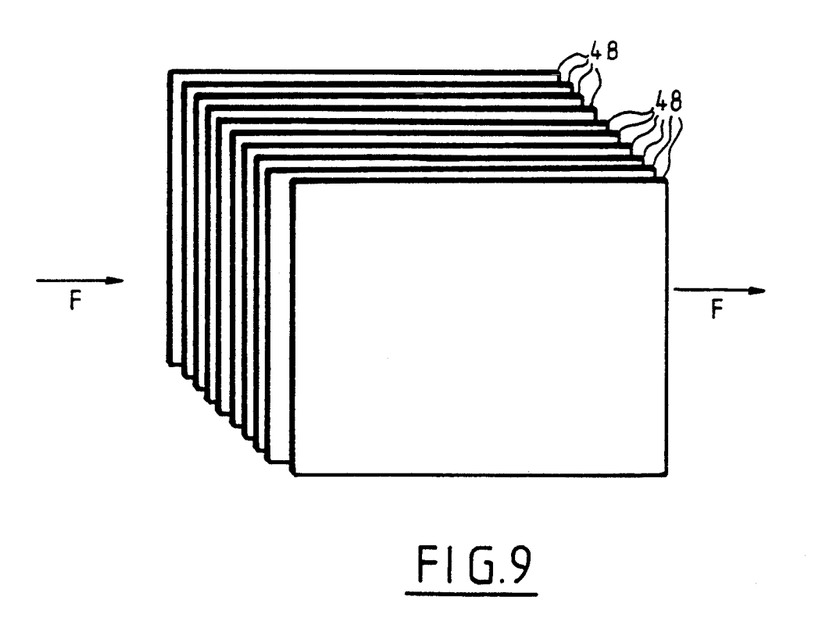
FIG. 9 is a view in perspective showing diagrammatically high voltage electrodes produced in the form of parallel plates.

In the embodiment of FIG. 9, to which reference should now be made, the high voltage electrodes are plates 48, each coated with an insulating layer, made for example from a polymer. These plates have an overall rectangular shape and are disposed parallel to each other forming, in pairs, a space which may for example have a thickness of 5 mm. The plates 48 are connected to the positive terminal of a high voltage DC supply by connections (not shown), which are welded to the said plates and insulated by the same layer of polymer. The counter-electrodes (not shown) are situated upstream or downstream of the plates 48 with respect to the direction of flow of the liquid to be treated, as shown by the arrows F. The metal pipes for feeding and discharging the liquid can also be chosen a counter-electrodes.

Figures 10, 11, 12:
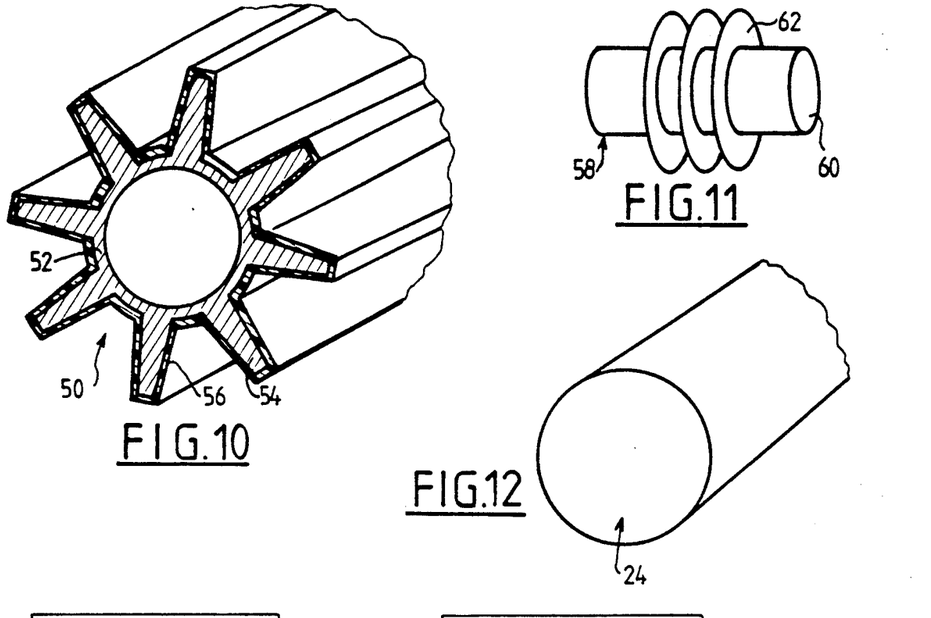
FIGS. 10 and 11 are views in perspective showing respectively two types of electrodes.
FIG. 12 is an elevation view of a counter-electrode.

Reference is now made to FIG. 10 which shows an electrode in the form of a section with a cross section in the form of a star. This is a hollow section having an annular part 52 supporting eight radial wings 54 of the same length and disposed equiangularly to each other. The external surface of the star-shaped section is coated with an insulating layer 56, made, for example, from a polymeric material.

FIG. 11 shows an electrode 58 comprising a hollow circular cylindrical tube 60 to which circular rings 62 are attached at regular intervals, the whole being coated with a insulating layer, for example of the polymeric type. The electrode 58 is designed to be energised at high voltage.

FIG. 12 shows a counter-electrode 24 made from a solid cylindrical bar of conductive material, this bar having a bare external surface. The counter-electrode 24 is designed to be connected to the negative terminal of a high voltage DC supply.

Figure 13:
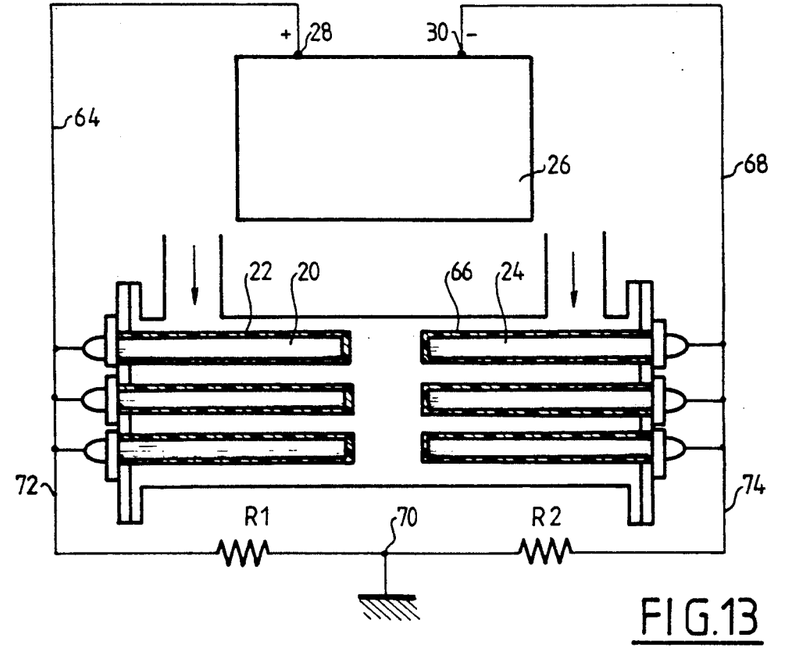
FIG. 13 shows diagrammatically a device in accordance with another embodiment, in which the electrodes and counter-electrodes are all coated with an insulating layer.

In the embodiment of FIG. 13, to which reference should now be made, the device also comprises a receptacle 10 similar to that shown earlier. The flange 16 supports several electrodes 20, each coated with an insulating layer 22. The electrodes 20 are parallel to each other and are immersed in the liquid circulating inside the receptacle. They are connected to the positive terminal 28 of a high voltage DC supply 26 by an electrical connection 64.

The flange 18 supports several counter-electrodes 24 which, in this case, are each coated with an insulating layer 66. These electrodes 24 are arranged parallel to each other and are immersed in the liquid running through the receptacle 10. They are connected to the negative terminal 30 of the power supply 26 by an electrical connection 68. A resistance bridge R1 and R2 is provided, incorporating an intermediate point 70 connected to earth, this bridge itself being connected on the one hand to the electrodes 20 by an electrical connection 72 and on the other hand to the counter-electrodes 24 by an electrical connection 74. The presence of such a resistance bridge is desirable for the reasons which will now be given.

In fact, if no point in the supply were earthed, the potential would be shared between the electrodes and counter-electrodes in inverse proportion to their capacitance with respect to the flow of conductive electrolyte. In this respect, it must be pointed out that the capacitance of the double layers, which is very high compared with that of the dielectric insulation of the electrodes, does not enter into the calculation (if a high capacitance is in series with a low capacitance, the capacitance of the whole is very close to the lower). It is possible to take advantage of this configuration if the chemical reactions to be catalysed relate to both the negative and positive ions. A defect in this arrangement is that the potentials vary if the surface area of the electrodes is modified or as a result of a break in the protective dielectric layer. In the latter case, all the potential would be transferred to the electrode of opposite polarity, which could result in a break in its protective dielectric layer. It will be understood, in these circumstances, that it is preferable to fix the potential of the electrodes by making the supply flow through a resistance bridge of which one point is connected to earth.

As has been indicated above, the insulating layer serving to cover the electrodes designed to be energised at high voltage and, as the case may be, the counter-electrodes designed to be energised at low voltage is advantageously made from a polymer. In this respect, three main categories of polymer can be used, namely: polyamides, polyolefines and fluorinated polymers.

Amongst the polyamides one may cite particularly those known by the trade names Technyl, Nylon, Rilsan, and particularly PA11 and Rilsan Amno. Polyamide of the PA11 type is particularly appropriate for the coating of plates since it absorbs to saturation 2% of its weight of water, which increases its relative dielectric constant. For a direct current, this constant can thus be estimated to be approximately 10, instead of 3.7 for the dry product and under alternating current. Its resistivity is of the order of $5 \times 10^{11}$ ohm m (measured on a sample 1 mm thick subjected to a voltage of 500 volts). The disruptive field strength is, for a thickness of 0.5 mm and for a sample saturated with water, of the order of 15 kV. A maximum applied voltage of 7 kV will be chosen. In these circumstances, the corresponding surface charge of the metal-polymer interface will be of the order of 0.125 $\mu$C cm$^{-2}$. This value is very low compared with the typical value of 10 $\mu$C cm$^{-2}$ of the double layer, and the effect obtained is negligible. However, the leakage current per m$^2$ would be approximately 30 microamperes if Ohm's law were applicable, and the transfer through the leakage resistance of 0.1 Cm$^{-2}$ (required to obtain the surface charge of the double layer of 10 $\mu$C cm$^{-2}$) would take almost one hour, which means that an accommodation time of one hour would be necessary before the device became effective. This time is reduced to a few minutes because of the effect mentioned above in relation to FIG. 3.

Amongst the polyolefines one may cite those sold under the trade names Napryl and Lacqtène, which are polyethylenes of the HD (high density) type which can be injection moulded onto metal electrodes. This polyethylene is practically non water absorbent, and its relative dielectric constant, for a direct current, can be estimated at approximately 3. Its resistivity is of the order of 10$^{16}$ ohm m at low voltage. Its intrinsic disruptive field strength is, for a thickness of 0.5 mm, of the order of 300 kV. However, this value is much lower if account is taken of the lack of homogeneity of the field. In addition, the disruptive field (ratio of the disruptive field strength to the thickness) decreases when the thickness increases. This is why it is an advantage to choose a layer of insulating coating as thin as possible, the limit being imposed by the dimensional tolerances on this thickness. In fact, for very thin layers, the inevitable variations between the thicknesses of the insulating layer deposited on the various conductors coated with insulation can lead to unacceptable local stresses on some parts of the electrodes. A reasonable value for the thickness of the layer of polymer is for example 0.5 mm. In this case, an applied voltage of the order of 30 kV will advantageously be chosen and, in these circumstances, the surface charge of the metal-polymer interface will be of the order of 1.5 $\mu$C cm$^{-2}$. This value is still low compared with the typical value of 10 $\mu$C cm$^{-2}$ of the double layer, and the effect obtained is less marked. The leakage current per m$^2$ would be of a few nanoamperes if Ohm's law were applicable, and the transfer by the leakage resistance of the charge of 0.1 Cm$^{-2}$ (required to obtain the surface charge of the double layer of 10 $\mu$C cm$^{-2}$) would require a practically infinite time. The effect mentioned above, in relation to FIG. 3, may be insufficient to reduce it to an acceptable value. This type of polymer cannot therefore be used for all applications.

Amongst the fluorinated polymers one may cite polytetrafluoroethylene (PTFE) such as sold under the trade names TEFLON, KEL-F, TEFLON FEP, and also perfluorinated polypropylene or polyethylene (FEP). These fluorinated polymers can be used for the coating of electrodes in the form of plates, cables and wires. These polymers are non-absorbent and only slightly subject to contamination by water, the absorption of water molecules to saturation being scarcely greater than in the case of polyethylenes (of the order of 1 mg of water for 100 g of polymer). Their relative dielectric constant is approximately 2. PTFE has a resistivity of 5$\times$10$^{16}$ ohms$\times$m and FEP 3$\times$10$^{13}$ ohms$\times$m at low voltage.

Their disruptive field strength is the same as that of the polyethylenes. A voltage of 30 kV over a thickness of 0.5 mm will be chosen. The density of surface charge obtained is 1 $\mu$C cm. The leakage current per m$^2$ for FEP would, if Ohm's law were applicable, be 2 microamperes, and half a day would be required to transfer the charge of 0.1 Cm$^{-2}$ to the polymer-electrolyte interface. The non-linear character of the law of conductivity reduces this time to an acceptable value.

The invention is of course open to numerous variants, in particular with respect to the relative disposition of the electrodes and/or counter-electrodes. These can also be made from a multiplicity of taut wires disposed parallel to the flow of liquid electrolyte in the receptacle or obliquely with respect to this flow.

In addition, the shape of the receptacle does not necessarily have to be cylindrical and receptacles can be designed with other shapes. Whatever the shape adopted, it is highly advantageous to choose receptacles having removable parts to which the or each electrode and counter-electrode are fixed, so as to permit easy replacement of these if necessary.

The invention is especially applicable to the treatment of river or mains water to prevent furring of cooling equipment, particularly in nuclear power stations.

We claim:

1. Device for the electrical treatment of a liquid electrolyte having a conductivity sufficiently high that a continuous electrical field applied thereto in the absence of the passage of current, does not penetrate the liquid electrolyte beyond a surface layer of a depth less than about 0.001 mm, the device comprising:
    a receptacle having an interior volume, an inlet and an outlet, creating a path for flow of liquid electrolyte therethrough;
    a first electrode having a conductive surface disposed within the receptacle, said conductive surface being completely coated with an insulating layer disposed between the conducting surface and interior volume;
    a further electrode disposed within the receptacle; and
    a direct current power supply electrically connected to said first electrode and said further electrode for applying a high voltage thereto sufficient to create stresses in the insulating layer and form in the electrolyte a barrier layer contacting at least said first electrode, thereby accelerating the electrical treatment of the liquid electrolyte.

2. A device as claimed in claim 1, further comprising a resistor having terminals connected, respectively, to ground and to said further electrode.

3. A device as claimed in claim 1, wherein said further electrode is coated with an insulating layer.

4. A device as claimed in claim 1, wherein said insulating layer comprises a polymer.

5. A device as claimed in claim 1, wherein said first and further electrodes are disposed in said receptacle astride the path for flow of said liquid electrolyte.

6. A device as claimed in claim 1, wherein one of said first and further electrodes is disposed upstream relative to the other electrode.

7. A device as claimed in claim 1, wherein at least said first electrode is formed in a shape for increasing the surface area of the first electrode.

8. A device as claimed in claim 7, wherein one of the first and further electrodes is connected to the positive terminal of said power supply and the shape of the electrode maximises the surface area.

9. A device as claimed in claim 7, wherein the shape of said first and further electrodes comprises a plate.

10. A device as claimed in claim 7, wherein the shape of at least said first electrode includes a star-shaped cross-section.

11. A device as claimed in claim 7, wherein the shape of at least said first electrode comprises a hollow cylinder.

12. A device as claimed in claim 11, wherein said shape further comprises at least one annulus having a greater diameter than said hollow cylinder, said at least one annulus being disposed coaxially with said cylinder.

13. A device as claimed in claim 1, further comprising a third electrode connected to said power supply and energised to a voltage intermediate that of said first electrode and said further electrode.

14. Device for the electrical treatment of a liquid electrolyte of a type that a continuous electrical field applied thereto does not penetrate the liquid electrolyte, the device comprising:
   a receptacle having an interior volume, an inlet and an outlet for flow of liquid electrolyte therethrough;
   a first electrode having a conductive surface disposed within the receptacle, said conductive surface being completely coated with an insulating layer disposed between the conducting surface and interior volume;
   a further electrode disposed within the receptacle and completely coated with an insulating layer;
   a power supply electrically connected to said first electrode and said further electrode for applying a high voltage thereto to form in the electrolyte a barrier layer contacting at least said first electrode, thereby accelerating the electrical treatment of the liquid electrolyte; and
   a resistance bridge disposed between said first and further electrodes, and having an intermediate point which is grounded.

15. Device for the electrical treatment of a liquid electrolyte of a type that a continuous electrical field applied thereto does not penetrate the liquid electrolyte, the device comprising:
   a receptacle having an interior volume, an inlet and an outlet for flow of liquid electrolyte therethrough;
   a first electrode having a conductive surface disposed within the receptacle, said conductive surface being completely coated with an insulating layer disposed between the conducting surface and interior volume;
   a further electrode disposed within the receptacle and completely coated with an insulating layer; and
   a power supply electrically connected to said first electrode and said further electrode for applying a high voltage thereto to form in the electrolyte a barrier layer contacting at least said first electrode, thereby accelerating the electrical treatment of the liquid electrolyte, said high voltage being in a range such that a field generated thereby is insufficient to cause a breakdown of the insulating layer but is sufficiently strong to cause migration of charges from said first or said further electrode across said insulating layer.

16. Device for the electrical treatment of a liquid electrolyte of a type that a continuous electrical field applied thereto does not penetrate the liquid electrolyte, the device comprising:
   a receptacle having an interior volume, an inlet and an outlet, creating a path for flow of liquid electrolyte therethrough;
   a first electrode having a conductive surface disposed within the receptacle, said conductive surface being completely coated with an insulating layer disposed between the conducting surface and interior volume;
   a further electrode disposed within the receptacle; and
   a power supply electrically connected to said first electrode and said further electrode for applying a high voltage thereto to form in the electrolyte a barrier layer contacting at least said first electrode, thereby accelerating the electrical treatment of the liquid electrolyte,
   wherein said first electrode comprises a plurality of wires each coated with an insulating layer, for increasing the surface area of said first electrode in contact with electrolyte.

17. A device as claimed in claim 16, wherein each wire is disposed parallel to the path for flow of liquid electrolyte.

18. A device as claimed in claim 16, wherein each wire is disposed at an angle to the path for flow of liquid electrolyte.

19. Device for the electrical treatment of a liquid electrolyte of a type that a continuous electrical field applied thereto does not penetrate the liquid electrolyte, the device comprising:
   a receptacle having an interior volume, an inlet and an outlet for flow of liquid electrolyte therethrough;
   a first electrode having a conductive surface disposed within the receptacle, said conductive surface being completely coated with an insulating layer disposed between the conducting surface and interior volume;
   a further electrode disposed within the receptacle;
   a power supply electrically connected to said first electrode and said further electrode for applying a high voltage thereto to form in the electrolyte a barrier layer contacting at least said first electrode, thereby accelerating the electrical treatment of the liquid electrolyte; and
   a resistor having terminals connected, respectively, to ground and to said further electrode.

* * * * *